(No Model.)
T. J. SAYRE.
SLIDING GAGE FOR JOINT RULES.
No. 245,874. Patented Aug. 16, 1881.
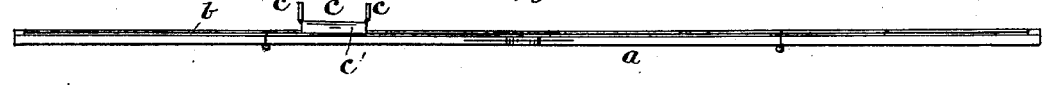
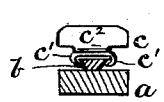
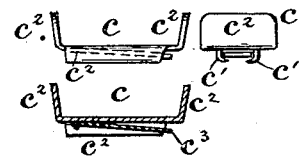
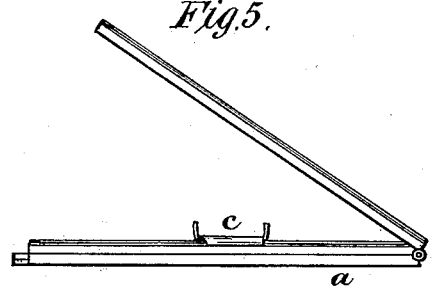
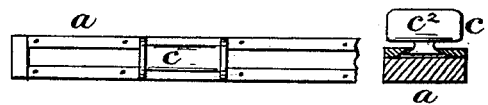
Witnesses:
M. M. Lacey
A. Parker.
Inventor:
Thomas J. Sayre
By R. S. & A. P. Lacey Attys.
N. PETERS. Photo-Lithographer, Washington, D. C.

UNITED STATES PATENT OFFICE.

THOMAS J. SAYRE, OF CAPE MAY, NEW JERSEY.

SLIDING GAGE FOR JOINT-RULES.

SPECIFICATION forming part of Letters Patent No. 245,874, dated August 16, 1881.

Application filed March 23, 1881. (No model.)

*To all whom it may concern:*

Be it known that I, THOMAS JEFFERSON SAYRE, a citizen of the United States, residing at Cape May, in the county of Cape May and State of New Jersey, have invented certain new and useful Improvements in Carpenter's-Rule Gages; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish a carpenter's measuring-rule provided with an adjustable gage; and it consists in the construction and arrangement of the several parts, hereinafter fully described, and pointed out in the claim.

In the drawings, Figure is a plan, Fig. 2 an edge view, and Fig. 3 a cross-section, of a folding rule having my invention applied thereto. Fig. 4 is the gage. Fig. 5 shows the rule folded, and Fig. 6 shows a modification.

$a$ is an ordinary carpenter's measuring-rule two feet in length. It is provided on its opposite sides with the usual scales of inches and fractional parts of an inch. It is made in sections of six inches, and folds together, as shown in Figs. 1, 2, and 5, or it may be made in one straight piece. For convenience in description, I shall call that side of the rule to which my invention is applied the "upper side," and the opposite side I will call the "under side."

In the folding rule shown in Figs. 1 and 2 the sections fold and bring the under side together, as shown in Fig. 5.

On the upper side of the rule I fix a longitudinal guide, $b$, by preference made dovetail in shape, as shown. This guide extends the entire length of the rule, and is adapted to carry a sliding gage, $c$. The gage $c$ is formed with the flanges $c'$ $c'$, which pass under the edges of the guide $b$ and retain it in place on the latter. The gage is also provided with the vertical lips $c^2$ $c^2$ on its opposite ends. The gage is made long enough so that a sufficient space will be provided between the end lips $c^2$ to admit the end of one of the fingers of the workman.

On the ends of the rule I form small concave recesses $d$ $d$, about half the depth of the ordinary lead-pencil. In these recesses the pencil is held when the rule is employed as a gage and marking-instrument. If desired, a small arch-plate or wire could be placed over the recesses $d$ and form a round opening, as shown in dotted lines, in which to place the pencil.

In a folding rule each section is provided with a guide, and the several guides are so formed and arranged that they will butt together when the rule is extended, and will form a continuous track, so that the gage can be easily slipped from one section to the next.

In Fig. 6 I have shown a modification in the construction of the parts. Instead of having a simple guide, as hereinbefore described, two strips are applied, having a dovetail slot between them. The gage is constructed with a dovetail tenon or foot, which fits into the slot and slides along the rule, the same as the device shown in the other figures of the drawings and hereinbefore described.

The operation of the device is readily understood. The workman can set the gage to the desired point, and can hold it in place by allowing one of the fingers of the hand which grasps the rule to rest between the lips $c^2$ $c^2$. With the other hand he can hold a pencil in the end recess, $d$. Then, by placing the lips $c^2$ against the edge of the timber, a line of uniform distance from the edge can readily be drawn. The gage $c$ occupies but a very small space, so that it does not interfere with the carrying of the rule in the pocket.

It will be seen that the flanges $c^2$ of the slide $c$ are about the same length of the slide. When the slide is over one of the hinged joints of the rule the flanges grasp the ends of the guides on both sections of the rule, and for the time being make the latter a stiff rule, which is often of importance in giving better results when the gage-mark is to be made at a distance a little less than the length of the section, or of two or more sections of the rule.

By this device a very convenient and useful device is provided, which will obviate many of the inconveniences attending the laying down of one tool to take up another.

It will be understood, further, that the rule could be made with a longitudinal dovetail groove formed in it on the line of the guide shown and described hereinbefore. This groove would carry the gage shown in Fig. 6, the same as the groove or channel between the two guides. I prefer to employ the single guide-strip hereinbefore described.

Having described my invention, what I claim, and desire to secure by Letters Patent, is—

The combination of a folding rule having on one side of the sections a sectional guideway the portions of which are arranged to abut one against the other when the rule is opened and form a continuous guideway, a gage, $c$, provided with the flanges $c^2$, which hold the slide to the guideway and to the rule, and when brought into proper position extend over the hinged joint of and unite the two abutting sections into a stiff rule, and the supporting-spring $c^3$, substantially as described.

In testimony whereof I affix my signature, in presence of two witnesses, on this 17th day of March, 1881.

THOMAS JEFFERSON SAYRE.

Witnesses:
 LINDA WARE,
 LIDA C. BAILEY.